US012785723B2

(12) United States Patent
Li et al.

(10) Patent No.: US 12,785,723 B2
(45) Date of Patent: Nov. 3, 2026

(54) COMMUNICATION CIRCUIT AND TERMINAL

(71) Applicant: Huawei Technologies Co., Ltd., Shenzhen (CN)

(72) Inventors: Weinan Li, Shanghai (CN); Weitao Jing, Shanghai (CN); Po Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 620 days.

(21) Appl. No.: 18/362,377

(22) Filed: Jul. 31, 2023

(65) Prior Publication Data

US 2023/0378980 A1 Nov. 23, 2023

Related U.S. Application Data

(63) Continuation of application No. PCT/CN2021/074640, filed on Feb. 1, 2021.

(51) Int. Cl.
*H04B 1/00* (2006.01)

(52) U.S. Cl.
CPC ......... *H04B 1/0028* (2013.01); *H04B 1/0067* (2013.01)

(58) Field of Classification Search
CPC ... H04B 1/0028; H04B 1/0067; H04W 84/12; H04W 88/06
See application file for complete search history.

(56) References Cited

U.S. PATENT DOCUMENTS

2002/0141441 A1 10/2002 Neumann et al.
2012/0049894 A1 3/2012 Berchtold et al.
2015/0303976 A1* 10/2015 Khlat ........................ B81B 7/02 455/78
2017/0033829 A1 2/2017 Homchaudhuri et al.
2017/0135125 A1 5/2017 Buthler
2019/0089396 A1* 3/2019 Kim ..................... H04B 1/3805

FOREIGN PATENT DOCUMENTS

CN 102036430 A 4/2011
CN 102404020 A 4/2012
CN 102420632 A 4/2012
JP 2003196228 A * 7/2003

* cited by examiner

*Primary Examiner* — Nguyen T Vo
(74) *Attorney, Agent, or Firm* — Slater Matsil, LLP

(57) ABSTRACT

In accordance with an embodiment, a communication circuit includes: an antenna configured to receive and send a first-mode signal and a second-mode signal; a baseband processing circuit; and a shared radio frequency circuit coupled between the baseband processing circuit and the antenna, wherein the shared radio frequency circuit is configured to process the first-mode signal and the second-mode signal in a time-division manner, where: the shared radio frequency circuit comprises a first control interface, the baseband processing circuit comprises a second control interface coupled to the first control interface via a control bus, and the second control interface is adapted to configure the shared radio frequency circuit to process the first-mode signal and the second-mode signal in the time-division manner.

20 Claims, 4 Drawing Sheets

COMMUNICATION CIRCUIT AND TERMINAL

CROSS-REFERENCE TO RELATED APPLICATIONS

This application is a continuation of International Application No. FCT/CN2021/074640, filed on Feb. 1, 2021, the disclosure of which is hereby incorporated by reference in its entirety.

TECHNICAL FIELD

This application relates to the communication field, and in particular, to a communication circuit and a terminal.

BACKGROUND

With the implementation and commercial use of a fifth-generation 5G communication technology of a cellular network and Wi-Fi 6 of a wireless local area network, a same set of electronic devices usually needs to support a scenario in which a plurality of working modes are used simultaneously. For example, an electronic device that supports both Wi-Fi 6 and 5G, or supports both 4G and 5G modes gradually becomes a standard configuration in the industry. In a conventional technology, a set of independent radio frequency hardware needs to be equipped for one mode. This brings great challenges to costs and an area of the electronic device.

SUMMARY

Embodiments of this application provide a communication circuit, to improve use efficiency of radio frequency hardware that supports multi-mode integration, and reduce costs and an area of the communication circuit.

It should be understood that in the solutions provided in embodiments of this application, a communication circuit may be a wireless communication device, or may be some components, for example, an integrated circuit product such as a system on chip or a communication chip, in a wireless communication device. The wireless communication device may be a computer device that supports a wireless communication function.

The communication circuit may include a baseband processing circuit and a radio frequency circuit. The baseband processing circuit sometimes is also referred to as a modem or a baseband circuit. The radio frequency circuit is a functional circuit configured to process a communication signal in a radio frequency analog field, and includes but is not limited to functions such as filtering, receiving, transmission, amplification, down-conversion, up-conversion, digital-to-analog, and analog-to-digital conversion. In physical implementation, some or all chips in the communication circuit may be integrated into a system on chip (SoC).

It should be understood that in the solutions provided in embodiments of this application, a chip is a circuit hardware structure having a complete chip package pin. The chip may be a single chip having a single bare die, or may be a module-level chip integrating a filter and a plurality of bare die structures.

According to a first aspect, a communication circuit is provided and includes: a shared radio frequency circuit, a baseband processing circuit, and an antenna. The antenna is configured to receive and send a first-mode signal and a second-mode signal. The shared radio frequency circuit is coupled between the baseband processing circuit and the antenna, and the shared radio frequency circuit is configured to process the first-mode signal and the second-mode signal in a time-division manner. The shared radio frequency circuit includes a slave control interface, and the baseband processing circuit includes a master control interface. The master control interface is coupled to the slave control interface by using a control bus, and is used for configuring the shared radio frequency circuit to process the first-mode signal and the second-mode signal in the time-division manner.

The master and slave control interfaces are respectively disposed in the baseband processing circuit and the shared radio frequency circuit that is configured to process the first-mode signal and the second-mode signal in the time-division manner, so that shared processing of signals in two modes can be implemented in one circuit. In addition, the main and slave control interfaces share control signals in two sets of modes, so that real-time and efficient mode switching is implemented.

In an optional implementation, the control bus includes a mobile industry processor interface (MIPI) control line or a general purpose input/output (GPIO) control line. MIPI and GPIO standard signals are used, so that a plurality of states can be controlled, and the shared radio frequency circuit can be more flexibly controlled.

In an optional implementation, when the shared radio frequency circuit is configured to switch from processing the first-mode signal to processing the second-mode signal, the shared radio frequency circuit is in a running mode. The switching in the running state avoids power consumption and startup time that are caused by disabling the shared radio frequency circuit to release a resource.

In an optional implementation, the shared radio frequency circuit is configured to continuously switch between processing the first-mode signal and processing the second-mode signal, to implement fast switching of the signals in two modes, and avoid an extra delay.

In an optional implementation, a signal transmitted by the control bus includes a control bit with a priority, which is used for configuring the priority of processing the first-mode signal and the second-mode signal by the shared radio frequency circuit. A control bit with a specific priority is fixed in the control bit, so that system consumption caused by resource sharing and preemption is avoided.

In an optional implementation, the shared radio frequency circuit includes a switch chip, the slave control interface includes a first slave control interface, the first slave control interface is disposed on the switch chip, and the switch chip configures a transmission path of the first-mode signal and the second-mode signal based on a control signal received by the first slave control interface. The switch chip that can be configured is used, so that gating of different signals may be implemented by using one switch chip, and more flexible radio frequency architecture multiplexing and radio frequency resource sharing are implemented.

In an optional implementation, the shared radio frequency circuit includes a power amplifier chip, the slave control interface includes a second slave control interface, the second slave control interface is disposed on the power amplifier chip, and the power amplifier chip is configured to amplify the first-mode signal and the second-mode signal based on a control signal received by the second slave control interface. A radio frequency power amplifier chip that can be shared is implemented, so that radio frequency resources are greatly saved.

In an optional implementation, a frequency range of the first-mode signal is different from and overlaps a frequency range of the second-mode signal. In consideration of design difficulty and bandwidth limitation of a power amplifier chip, a power amplifier is shared for signals that are in different modes and that have the foregoing signal characteristics, so that design difficulty and implementation costs are reduced.

In an optional implementation, the shared radio frequency circuit includes an envelope tracking chip, the slave control interface includes a third slave control interface, the third slave control interface is disposed on the envelope tracking chip, and the envelope tracking chip is configured to supply, based on a control signal received by the third slave control interface, power to a power amplifier used for the first-mode signal and the second-mode signal. The power is supplied to the power amplifier of the signals in different modes by using the envelope tracking chip configured to further reduce power consumption of the power amplifier, so that the area and costs that are of the communication circuit can be further reduced.

In an optional implementation, the envelope tracking chip includes an envelope tracking mode and an average power tracking mode, where a bandwidth of the first-mode signal is greater than a bandwidth of the second-mode signal, the envelope tracking chip is configured to supply power to the power amplifier in the average power tracking mode for the first-mode signal, and the envelope tracking chip is configured to supply power to the power amplifier in the envelope tracking mode for the second-mode signal. In consideration of bandwidth characteristics of the signals in different modes, the envelope tracking chip configured to implement the foregoing functions may have higher design costs and power consumption.

In an optional implementation, the shared radio frequency circuit includes a low noise amplifier chip, the slave control interface includes a fourth slave control interface, the fourth slave control interface is disposed on the low noise amplifier chip, and the low noise amplifier chip is configured to amplify the first-mode signal and the second-mode signal based on a control signal received by the fourth slave control interface. A low noise amplifier chip that can be shared is implemented, so that the radio frequency resources are further saved.

In an optional implementation, the shared radio frequency circuit includes a radio frequency transceiver chip, the slave control interface includes a level-1 slave control interface and a level-2 master control interface, the level-1 slave control interface and the level-2 master control interface are jointly disposed on the radio frequency transceiver chip, the radio frequency transceiver chip receives configuration of the baseband processing circuit through the level-1 slave control interface, and the radio frequency transceiver chip configures a level-2 slave control interface through the level-2 master control interface. Main control is set twice, so that the shared radio frequency circuit may have better flexibility and shared switching response.

In an optional implementation, the level-2 slave control interface includes one or more of the first slave control interface, the second slave control interface, the third slave control interface, and the fourth slave control interface.

In an optional implementation, the first-mode signal is a 5G signal, and the second-mode signal is a 4G signal. Based on a same communication standard, sharing of 4G and 5G radio frequency resources is more operable and competitive.

In an optional implementation, the first-mode signal is a cellular network signal, and the second-mode signal is a wireless local area network signal.

In an optional implementation, the first-mode signal is a 4G signal or a 5G signal, and the second-mode signal is a Wi-Fi 6 signal or a Wi-Fi 5 signal.

In an optional implementation, the baseband processing circuit includes a first baseband processing chip and a second baseband processing chip, the master control interface includes a first master control interface and a second master control interface, the first master control interface is located on the first baseband processing chip, the second master control interface is located on the second baseband processing chip, and the first master control interface and the second master control interface are coupled to the slave control interface by using the control bus. Different communication standards are integrated into different chips, so that chip manufacturing costs are better.

According to a second aspect, a terminal is further provided and includes a memory, a processor, an input/output apparatus, and the communication circuit in one of the foregoing optional implementations.

Figure 1:
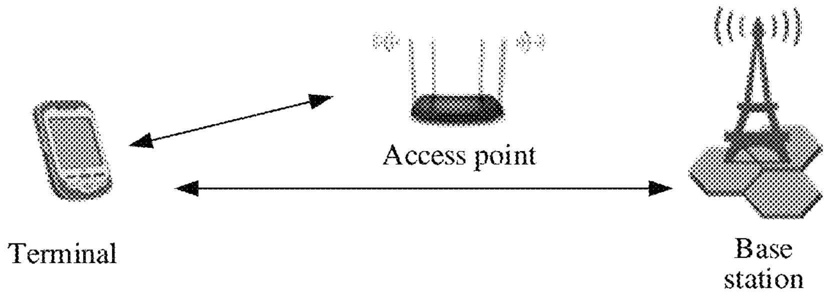
FIG. 1 is a schematic diagram of a wireless communication system that supports a plurality of communication protocols according to an embodiment of this application.

It should be understood that, in the foregoing schematic diagrams, sizes and forms of block diagrams are for reference only, and should not constitute an exclusive interpretation of embodiments of this application. Relative locations and inclusion relationships between the block diagrams shown in the schematic diagrams of structures are merely used for schematically representing structural associations between the block diagrams, rather than limiting a physical connection manner in embodiments of this application.

DETAILED DESCRIPTION OF ILLUSTRATIVE EMBODIMENTS

The following further describes the technical solutions provided in this application with reference to the accompanying drawings and embodiments. It should be understood that a system structure and a service scenario provided in embodiments of this application are mainly intended to explain some possible implementations of the technical solutions in this application, and should not be construed as a unique limitation on the technical solutions in this application. A person of ordinary skill in the art may know that, as a system evolves and an updated service scenario emerges, the technical solutions provided in this application are still applicable to same or similar technical problems.

It should be understood that the technical solutions provided in embodiments of this application include a sounding reference signal sending method and a related apparatus. Principles for resolving problems by using the technical solutions are the same or similar. In descriptions in the following specific embodiments, although same content may not be repeated, it should be considered that the specific embodiments are mutually referenced and may be combined with each other.

In a wireless communication system, devices may be classified into devices that provide a wireless network service and devices that use a wireless network service. The devices that provide the wireless network service are devices that form a wireless communication network, and may be briefly referred to as network devices (network equipment) or network elements. The network devices generally belong to operators (for example, China Mobile and Vodafone) or infrastructure providers (for example, China Tower), and are operated or maintained by these vendors. The network devices may further be classified into radio access network (RAN) devices and core network (CN) devices. Typical RAN devices include a base station (BS).

It should be noted that, the base station may be a generation NodeB (generation NodeB, gNB) in a 5G new radio (NR) system or an evolved NodeB (eNB) in a 4G long term evolution (LTE) system. Base stations may be classified into a macro base station and a micro base station based on different physical forms or transmit powers of the base stations. The micro base station sometimes is also referred to as a miniature base station or a small cell.

The devices that use the wireless network service are generally located on an edge of a network, and may be briefly referred to as terminals. A terminal can establish a connection to a network device, and provides a specific wireless communication service for a user based on a service of the network device. It should be understood that, because the terminal has a closer relationship with the user, the terminal sometimes is also referred to as a user equipment (UE) or a subscriber unit (SU). In addition, compared with a base station that is generally placed at a fixed location, the terminal usually moves along with the user, and sometimes is also referred to as a mobile station (MS). In addition, some network devices such as a relay node (RN) or a wireless router sometimes may also be considered as terminals because the network devices have a UE identity or belong to a user.

The base station mainly covers an outdoor communication scenario, and a wireless local area network (WLAN) device specially configured for covering an indoor communication scenario exists in the wireless communication system. The base station generally complies with a wireless communication standard of the third generation partnership project (3GPP), and the WLAN device generally complies with another wireless communication standard, for example, a wireless communication standard of an 802 series (such as 802.11, 802.15, or 802.20) of the Institute of Electrical and Electronics Engineers (IEEE).

Communication devices of the 802 series include access points (APs) and stations (STAs). The AP is a wireless access point, a creator of one wireless network, and a central node of the network. Generally, a wireless router used in a home or office is one AP. The STA station means that each terminal connected to a wireless network (for example, a notebook computer, a PDA, or another user equipment that can connect to the network) can be referred to as one station.

Therefore, a terminal corresponding to the base station and the wireless local area network may be a mobile phone, a tablet computer, a laptop computer, a wearable device (for example, a smart watch, a smart band, a smart helmet, or smart glasses), or other devices that have a wireless access capability, for example, an intelligent vehicle and various internet of things (IOT) devices including various smart home devices (such as a smart meter and a smart home appliance) and smart city devices (such as a security or monitoring device and an intelligent road transportation facility).

For ease of description, the technical solutions in embodiments of this application are described in detail by using the base station, the access point, and the terminal as examples in this application.

FIG. 1 is a schematic diagram of a wireless communication system that supports a plurality of communication protocols according to an embodiment of this application. As shown in FIG. 1, the wireless communication system includes a terminal, a base station, and a wireless router.

In the wireless communication system, the base station may provide communication coverage for a specific geographical area by using an integrated or external antenna device. One or more terminals in a communication coverage area of the base station may be connected to the base station. One base station may manage one or more cells. Each cell has one identification. The identification is also referred to as a cell identity (cell ID). From a perspective of a radio resource, a cell is a combination of a downlink radio resource and an uplink radio resource (optional) that is paired with the downlink radio resource.

In the wireless communication system, the terminal and the base station each support one or more same RATs, for example, 5G NR, 4G LTE, or a RAT for a future evolved system. Specifically, the terminal and the base station use a same air interface parameter, coding scheme, modulation scheme, and the like, and communicate with each other based on a radio resource specified by the system.

It should be understood that the wireless communication system may comply with a wireless communication standard of the third generation partnership project (3GPP).

Further, in FIG. 1, the wireless router is further included. In addition to accessing a cellular network, the terminal may further support accessing the wireless router. The terminal and the wireless router may comply with, for example, a wireless communication standard of an 802 series (such as 802.11, 802.15, or 802.20) of the Institute of Electrical and Electronics Engineers (IEEE).

It should be understood that, although FIG. 1 shows only one base station, one terminal, and one wireless router, the wireless communication system may also include another quantity of base stations, terminals, and wireless routers. In addition, the wireless communication system may further include an electronic device of another communication standard, for example, IoT or BT.

Figure 2:
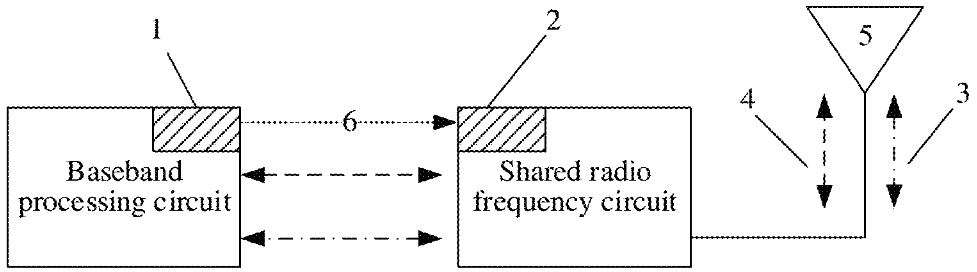
FIG. 2 is a schematic diagram of a communication circuit that supports signals in different modes according to an embodiment of this application.

FIG. 2 is a schematic diagram of a communication circuit that supports signals in different modes according to an embodiment of this application. The communication circuit includes an antenna 5, a shared radio frequency circuit, and a baseband processing circuit. The antenna 5 is configured to receive and send a first-mode signal 3 and a second-mode signal 4. The signal 3 and the signal 4 may be signals of different versions in a same wireless communication standard. For example, the signal 3 may be a 4G signal, and the signal 4 may be a 5G signal. Alternatively, the signal 3 and the signal 4 may be signals in different communication standards. For example, the signal 3 may be a cellular signal, for example, including but not limited to a 4G signal or a 5G signal. The signal 4 may be a Wi-Fi signal, including but not limited to a Wi-Fi 6 signal or a Wi-Fi 5 signal.

The shared radio frequency circuit is configured to process the signal 3 and the signal 4 in a time-division manner, for example, configured to transmit the time-division signal 3 in a first time period, and transmit the signal 4 in a second time period. The shared radio frequency circuit is coupled between the baseband processing circuit and the antenna. The baseband processing circuit is configured to process the signal 3 or the signal 4 in a digital domain.

A master control interface 1 and a slave control interface 2 are respectively disposed for the baseband processing circuit and the shared radio frequency circuit, to prevent the signal 3 and the signal 4 from preempting resources of the shared radio frequency circuit. A control bus 6 is coupled between the master control interface 1 and the slave control interface 2, and is configured to transmit a control signal of a baseband control circuit for the shared radio frequency circuit, to implement configuration of the baseband control circuit for the shared radio frequency circuit.

For example, the master control interface 1 and the slave control interface 2 may be GPIO interfaces, and the control signal implements the configuration of the baseband control circuit for the shared radio frequency circuit by using a high level state and a low level state.

Optionally, the master control interface 1 and the slave control interface 2 may be MIPI interfaces. Compared with the GPIO interface having high and low level states for control, an MIPI conforms with an I2C protocol. Therefore, GPIO does not have a clock line and controls a small quantity of states. However, the MIPI has a clock line and a data line, and a controlled component has various registers to control different component states, so that more states can be flexibly controlled.

Preferably, to optimize a waiting problem that is caused by resource preemption and that is brought by software arbitration, a system may set a control bit with a priority in the control signal. For example, in 000X, if X is 1, the shared radio frequency circuit is configured with a high priority. Alternatively, if X is 0, the shared radio frequency circuit is configured with a low priority. The shared radio frequency circuit directly makes a corresponding response based on a priority of an instruction in the control signal. For example, if a priority of an instruction indicating to switch to a state of transmitting the signal 3 is high, the shared radio frequency circuit directly switches from a state of transmitting the signal 4 to the state of transmitting the signal 3. If a priority of an instruction, for example, indicating to switch back to the state of transmitting the signal 4, of the control signal is low, the shared radio frequency circuit continues to maintain the state of transmitting the signal 3. Because an upper layer does not need to determine and preempt a resource of the shared radio frequency circuit, the shared radio frequency circuit does not need to perform a step of powering off and releasing the resource. When the system switches from transmitting the signal 3 to transmitting the signal 4, the shared radio frequency circuit may maintain a running state. In this way, a time interval between power-on and power-off of the shared radio frequency circuit is reduced, time for a wireless communication apparatus to switch between signals in different modes is reduced, and corresponding time is increased.

Further, to implement smoother switching transition, the shared radio frequency circuit may integrate priority determining logic, and perform autonomous logic determining on a control signal including a priority. The shared radio frequency circuit responds, based on priority information in the control signal, to a control instruction received on the control bus. For example, two priorities are used as examples. The shared radio frequency circuit determines a priority of an instruction in a control signal. If the priority of the instruction in the control signal is high, a priority of a current working state is determined. When the priority of the control signal is greater than the priority of the current working state (where a higher-priority mode in the system starts), the current working state is saved, and switching is performed based on the control signal. When a priority of a received control signal is low, the saved working state is updated, but an updated working state does not take effect. After a high-priority instruction task is completed and exited, a previously-saved low-priority working state is restored and takes effect immediately.

Figure 3:
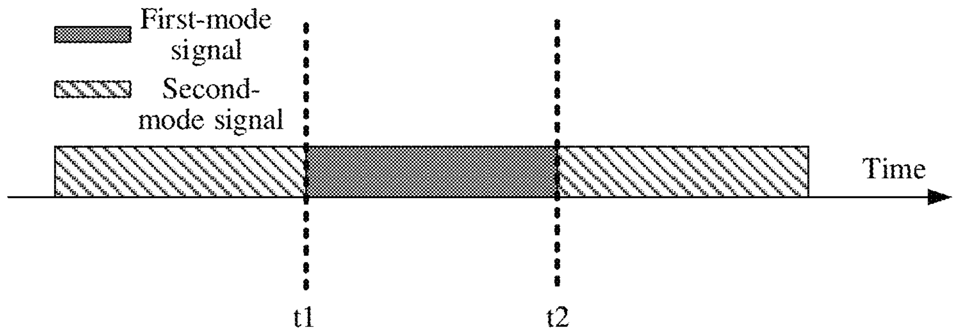
FIG. 3 is a schematic diagram of switching between signals in different modes according to an embodiment of this application.

The foregoing integrated priority determining logic is used, so that the wireless communication apparatus can implement continuous state switching shown in FIG. 3. When a priority of a first-mode signal in the control signal is high, and the working state is in a state of transmitting a second-mode signal, the shared radio frequency circuit switches from the second-mode signal to the first-mode signal at a moment t1. After a task of transmitting the first-mode signal is completed, at a moment t2, the state of transmitting the first-mode signal is switched back to a state of transmitting the second-mode signal. Therefore, as shown in FIG. 3, it can be learned that the wireless communication apparatus continuously switches between transmitting the first-mode signal and transmitting the second-mode signal.

Figure 4:
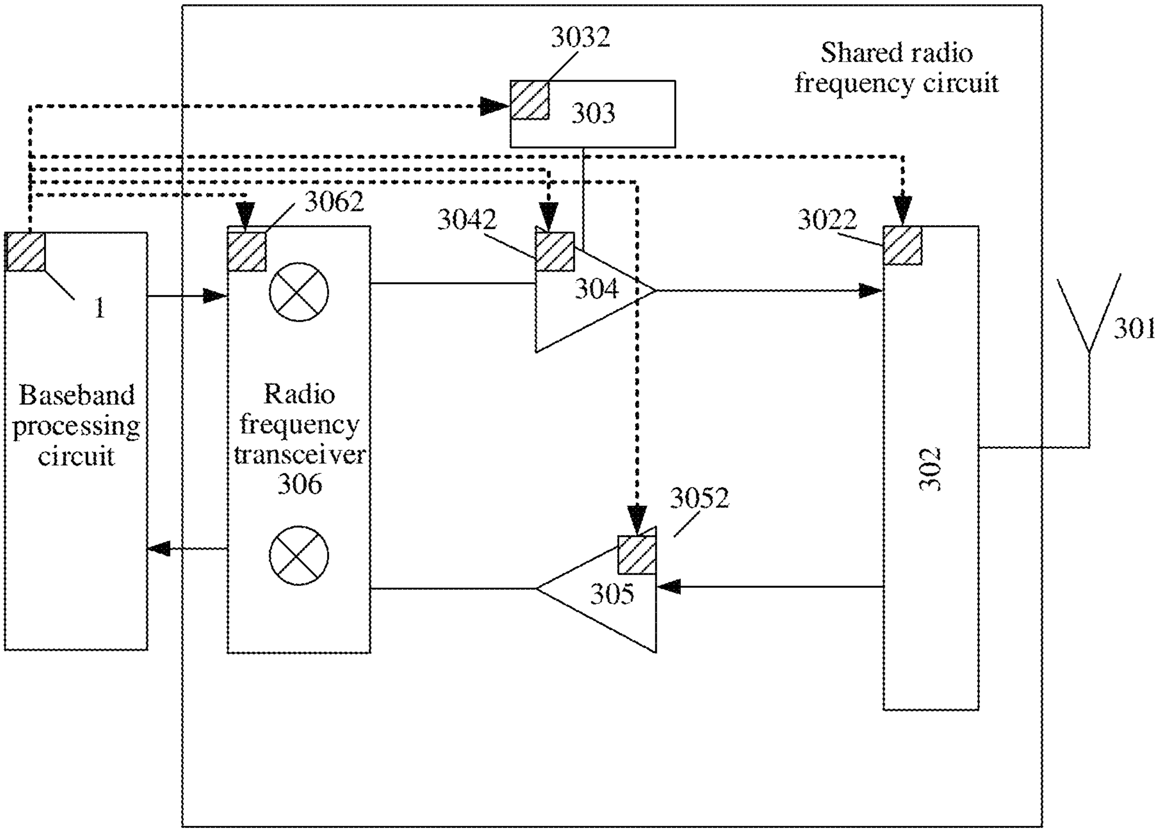
FIG. 4 is a schematic diagram of another communication circuit that supports signals in different modes according to an embodiment of this application.

FIG. 4 is a schematic diagram of another communication circuit that supports signals in different modes according to an embodiment of this application. As shown in FIG. 4, a shared radio frequency circuit may include but is not limited to a switch chip 302. The switch chip 302 is coupled between an antenna 301 and a plurality of other radio frequency chips, and is configured to implement sharing and selection between the antenna 301 and the plurality of radio frequency chips. When the antenna 301 is configured to receive and send a first-mode signal and a second-mode signal, the switch chip 302 may implement selection and sharing of the first-mode signal and the second-mode signal. The switch chip 302 may integrate a first slave control interface 3022, to transmit a control signal with priority information with a master control interface 1 of a baseband processing circuit by using a control bus.

Optionally, the shared radio frequency circuit may further include a power amplifier chip 304. For example, the first-mode signal is a 5G signal, and the second-mode signal is a 4G signal. The power amplifier 304 may be designed as a broadband power amplifier, and covers both a 5G radio frequency band and a 4G radio frequency band. Similarly, the power amplifier 304 may also integrate a second slave control interface 3042, to receive, by using the control bus, a control signal that is transmitted by the master control interface 1 of the baseband processing circuit and that has priority information. The power amplifier chip 304 may be a separate power amplifier bare die, or may be a module-level chip integrating a plurality of power amplifier bare dies. When the power amplifier chip 304 is the latter one, the plurality of power amplifier bare dies share a control signal of the second slave control interface 3042.

Optionally, the shared radio frequency circuit may further include a low noise amplifier chip 305. Similarly, the low noise amplifier chip 305 may be designed as a broadband amplifier, and covers both the 5G radio frequency band and the 4G radio frequency band. The low noise amplifier chip 305 is configured to integrate a third slave control interface 3052, to receive, by using the control bus, a control signal that is transmitted by the master control interface 1 of the baseband processing circuit and that has priority information. The low noise amplifier chip 305 may be a separate low noise amplifier bare die, or may be a module-level chip integrating a plurality of low noise amplifier bare dies. When the low noise amplifier chip 305 is the latter one, the plurality of low noise amplifier bares share the third slave control interface 3052.

Preferably, in current 5G NR frequency bands for commercial use, N77 (3300 MHz to 3800 MHz) and N78 (3300 MHz to 4200 MHz) are preferred for commercial use. Because N77 and N78 are different from and overlap B42 (3400 MHz to 3600 MHz), B43 (3600 MHz to 3800 MHz) of LTE, in terms of design optimization and control difficulty of a hardware resource, the power amplifier 304 and the low noise amplifier 305 preferentially implement time-division sharing of signals in two modes in the foregoing frequency bands.

Optionally, the shared radio frequency circuit may further include an envelope tracking chip 303. The envelope tracking chip 303 may include an envelope tracking module and an average power tracking module. The envelope tracking chip 303 may be used for time-division sharing of 4G and 5G power amplifiers. Similarly, the envelope tracking chip 303 may integrate a fourth slave control interface 3032, to receive, by using the control bus, a control signal that is transmitted by the master control interface 1 of the baseband processing circuit and that has priority information.

Preferably, in a 5G mode, a bandwidth for transmitting a signal is close to 100 MHz, and the bandwidth is much greater than 20 MHz in LTE. Therefore, in a 4G mode, an ET mode may be preferably enabled in the envelope tracking chip 303, and in the 5G mode, an APT mode may be preferably enabled.

Optionally, the shared radio frequency circuit may further include a radio frequency transceiver 306. The radio frequency transceiver 306 may integrate a fifth slave control interface 3062, to receive, by using the control bus, a control signal that is transmitted by the master control interface 1 of the baseband processing circuit and that has priority information. For example, one or more functional circuits in a receive channel of a radio frequency transceiver may implement time-division sharing of 4G and 5G signals. For example, a shared functional circuit in the receive channel may include but is not limited to one or more of a frequency mixer, a low noise amplifier, a filter, an analog-to-digital converter (ADC), and a phase-locked loop.

Time-division sharing may be flexibly designed and adjusted based on a specific functional circuit. For example, the analog-to-digital converter may include a first ADC and a second ADC. When the first-mode signal is processed as a narrowband signal, for example, a 4G intermediate frequency signal, only the first ADC may be used. When the second-mode signal is processed as a broadband signal, for example, a 5G intermediate frequency signal, the first ADC and the second ADC may be used.

Optionally, one or more functional circuits in a transmit channel of the radio frequency transceiver may implement time-division sharing of 4G and 5G signals. For example, a shared functional circuit in the transmit channel may include but is not limited to one or more of a frequency mixer, a power amplifier, a filter, a digital-to-analog converter (ADC), and a phase-locked loop.

Figure 5:
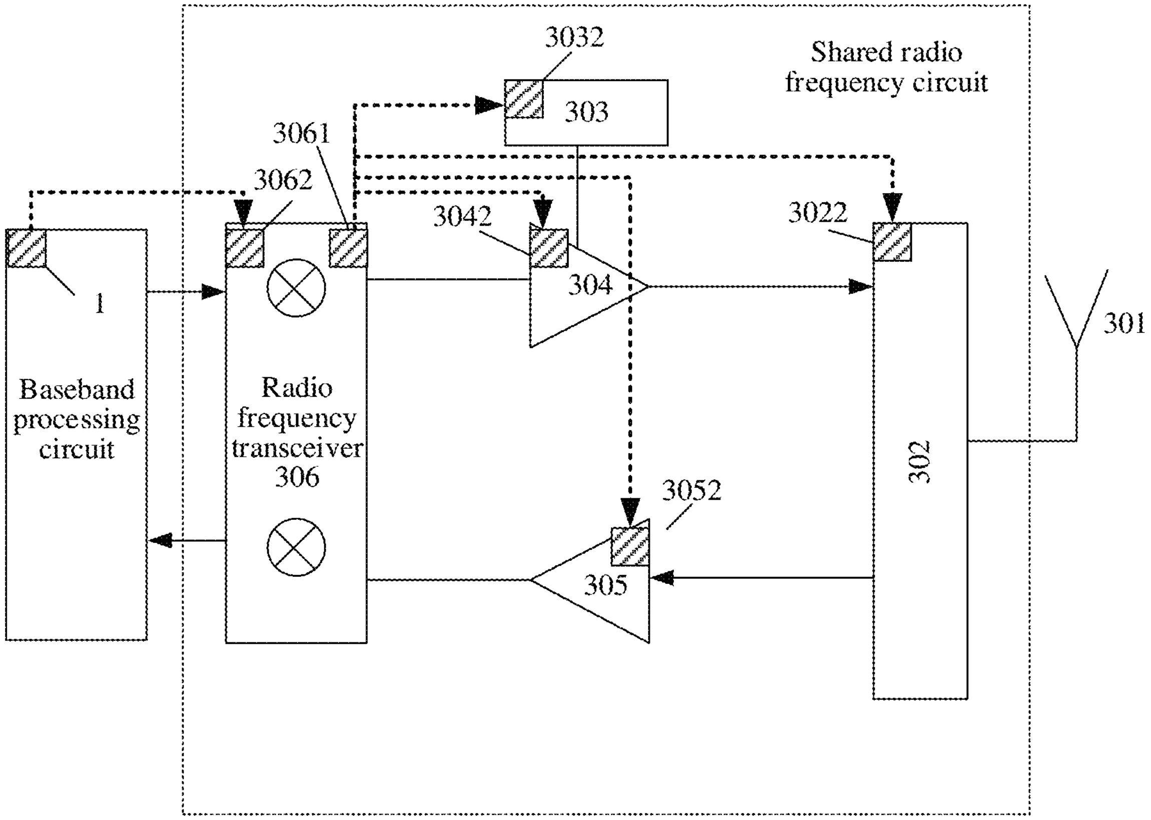
FIG. 5 is a schematic diagram of another communication circuit that supports signals in different modes according to an embodiment of this application.

FIG. 5 is a schematic diagram of another communication circuit that supports signals in different modes according to an embodiment of this application. Based on the foregoing embodiment, this embodiment uses a solution of a two-level control bus. At a first level, a master control interface 1 of a baseband control circuit and a slave control interface 3062 of a radio frequency transceiver perform first-level control. The radio frequency transceiver 306 implements time-division sharing based on a priority of a control signal of the baseband control circuit.

At a second level, the radio frequency transceiver 306 performs hierarchical control on one or more of 303, 304, 305, and 306 through a second master control interface 3061.

Figure 6:
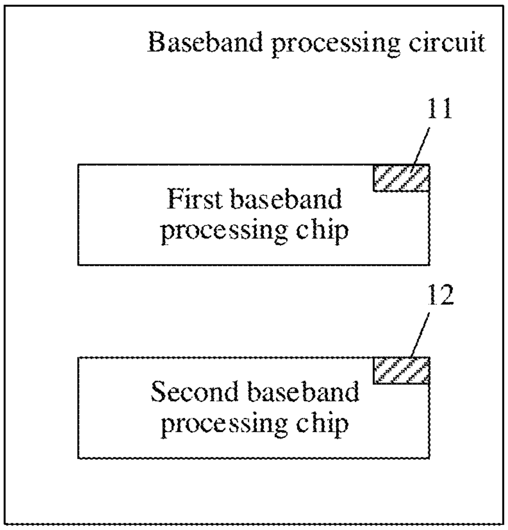
FIG. 6 is a schematic diagram of a baseband processing circuit that supports signals of different wireless communication standards according to an embodiment of this application.

FIG. 6 is a schematic diagram of a baseband processing circuit that supports signals of different wireless communication standards according to an embodiment of this application. It is assumed that a first-mode signal and a second-mode signal are the signals of the different communication standards. For example, the first-mode signal may be a cellular signal, including but not limited to a 4G signal or a 5G signal. The second-mode signal may be a Wi-Fi signal, including but not limited to a Wi-Fi 6 signal or a Wi-Fi 5 signal. Generally, for a baseband processing circuit, based on different complexity, functions of processing the supported signals of the different communication standards are usually integrated into different physical chips. As shown in FIG. 6, based on the foregoing embodiment, the baseband processing circuit may include a first baseband processing chip and a second baseband processing chip. For example, the first baseband processing chip may be configured to implement baseband processing of a cellular signal, and the second baseband processing chip is configured to implement baseband processing of a Wi-Fi signal.

Optionally, a master control interface configured to control a shared radio frequency circuit may include two parts: a first master control interface 11 and a second master control interface 12. The first master control interface 11 is disposed on the first baseband processing chip, and the second master control interface 12 is disposed on the second baseband processing chip. The first master control interface 11 and the second master control interface 12 are jointly coupled to one or more slave control interfaces in the shared radio frequency circuit, and jointly control, by using a shared control bus, switching of a working state of one or more radio frequency modules in the shared radio frequency circuit from processing the first-mode signal to processing the second-mode signal.

Optionally, the first baseband processing chip and the second baseband processing chip may alternatively share only one master control interface. The master control interface is disposed on the first baseband processing chip, is coupled to one or more slave control interfaces in the shared radio frequency circuit, and controls, by using the shared control bus, switching of a working state of one or more radio frequency modules in the shared radio frequency circuit from processing the first-mode signal to processing the second-mode signal.

Figure 7:
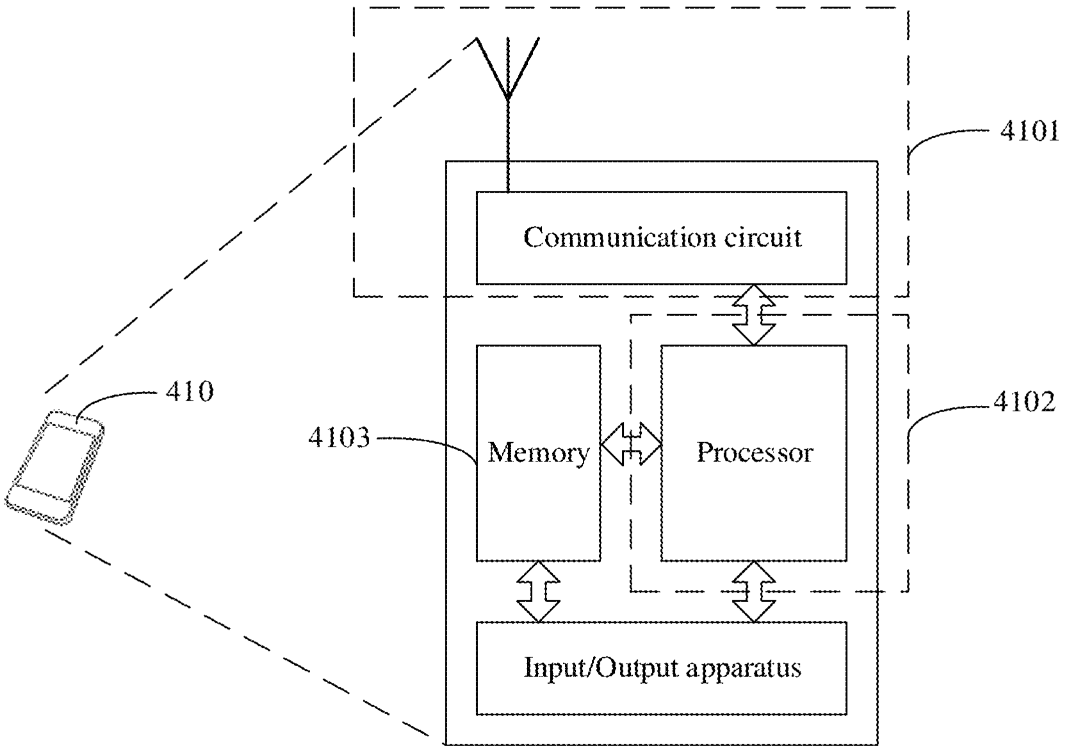
FIG. 7 is a schematic diagram of a terminal according to an embodiment of this application.

An embodiment of this application further provides a terminal 410. Refer to FIG. 7. The terminal 410 may include a communication circuit 4101, a memory 4103, a processor 4102, and an input/output apparatus. The shared radio frequency circuit and the baseband processing circuit in the foregoing embodiments are disposed in the communication circuit 4101 herein.

The processor 4102 is mainly configured to control the entire terminal, execute a software program, and process data of the software program. For example, the processor 4102 is configured to support an electronic device in performing the actions described in the foregoing method embodiments. The memory 4103 is mainly configured to store the software program and the data. The communication circuit is mainly configured to perform conversion between a baseband signal and a radio frequency signal, and process the radio frequency signal and the baseband signal. The input/output apparatus, such as a touchscreen, a display, or a keyboard, is mainly configured to receive data input by a user and output data to the user.

After the terminal 410 is powered on, the processor 4102 may read the software program in the memory 4103, interpret and execute instructions of the software program, and process the data of the software program. When data needs to be sent wirelessly, after performing baseband processing on the to-be-sent data, the communication circuit outputs a baseband signal to a radio frequency circuit. After performing radio frequency processing on the baseband signal, the radio frequency circuit sends a radio frequency signal to the outside in a form of an electromagnetic wave by using an antenna. When data is sent to the terminal 410, the radio frequency circuit receives the radio frequency signal by using the antenna, converts the radio frequency signal into a baseband signal, and then converts the baseband signal into data and processes the data.

In embodiments of this application and the accompanying drawings, the terms “first”, “second”, “third”, and the like are intended to distinguish between similar objects but do not necessarily indicate a specific order or sequence. In addition, the terms “include”, “have”, and any other variants thereof are intended to indicate non-exclusive inclusions, for example, including a series of steps or units. The method, system, product, or device is not limited to the steps or units that are literally listed, but may include other steps or units that are not literally listed or that are inherent to these processes, methods, products, or devices.

It should be understood that in this application, “at least one” refers to one or more, and “a plurality of” refers to two or more. “And/or” is used for describing an association relationship between associated objects, and represents that three relationships may exist. For example, “A and/or B” may represent the following three cases: Only A exists, only B exists, and both A and B exist. A and B may be singular or plural. The character “/” generally indicates an “or” relationship between the associated objects. “At least one of the following items (pieces)” or a similar expression thereof means any combination of these items, including a single item (piece) or any combination of plural items (pieces). For example, at least one of a, b, or c may represent: a, b, c, a and b, a and c, b and c, or a, b, and c, where a, b, and c may be singular or plural.

It should be understood that sequence numbers of the foregoing processes do not mean execution sequences in this application. The execution sequences of the processes should be determined based on functions and internal logic of the processes, and should not be construed as any limitation on the implementation processes of embodiments of this application. The term “coupled” mentioned in this application is used for indicating interworking or interaction between different components, and may include a direct connection or an indirect connection via another component.

All or some of the foregoing embodiments of this application may be implemented by using software, hardware, firmware, or any combination thereof. When software is used for implementing the embodiments, a part or all of the embodiments may be implemented in a form of a computer program product. The computer program product includes one or more computer program code or computer program instructions. When the computer program instructions are loaded and executed on a computer, the procedures or functions according to embodiments of this application are all or partially generated. The computer may be a general-purpose computer, a dedicated computer, a computer network, or another programmable apparatus.

The computer program code or the computer program instructions may be stored in a computer-readable storage medium or may be transmitted from a computer-readable storage medium to another computer-readable storage medium. For example, the computer program code or the computer program instructions may be transmitted from a website, computer, server, or data center to another website, computer, server, or data center in a wired (for example, a coaxial cable or an optical fiber) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium, such as a floppy disk, a hard disk, or a magnetic tape; may be an optical medium, for example, a DVD; or may be a semiconductor medium, for example, a solid-state disk (SSD).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication circuit, comprising:

an antenna configured to receive and send a first-mode signal and a second-mode signal;

a baseband processing circuit; and a shared radio frequency circuit coupled between the baseband processing circuit and the antenna, wherein the shared radio frequency circuit is configured to process the first-mode signal and the second-mode signal in a time-division manner, wherein:

the shared radio frequency circuit comprises a first control interface, the baseband processing circuit comprises a second control interface coupled to the first control interface via a control bus, the second control interface is adapted to configure the shared radio frequency circuit to process the first-mode signal and the second-mode signal in the time-division manner, the shared radio frequency circuit comprises a radio frequency transceiver chip, the first control interface comprises a level-1 slave control interface and a level-2 master control interface, the level-1 slave control interface and the level-2 master control interface are jointly disposed on the radio frequency transceiver chip, the radio frequency transceiver chip is adapted to receive a configuration of the baseband processing circuit through the level-1 slave control interface, and the radio frequency transceiver chip is adapted to configure a level-2 slave control interface through the level-2 master control interface.

2. The communication circuit according to claim 1, wherein the control bus comprises a mobile industry processor interface (MIPI) control line or a general purpose input/output (GPIO) control line.

3. The communication circuit according to claim 1, wherein the shared radio frequency circuit is configured to switch from processing the first-mode signal to processing the second-mode signal while operating in a running mode.

4. The communication circuit according to claim 1, wherein the shared radio frequency circuit is configured to continuously switch between processing the first-mode signal and processing the second-mode signal.

5. The communication circuit according to claim 1, wherein a signal transmitted by the control bus comprises a control bit signifying a priority of processing the first-mode signal and the second-mode signal by the shared radio frequency circuit.

6. The communication circuit according to claim 1, wherein the shared radio frequency circuit comprises a switch chip;

the first control interface comprises a first slave control interface;

the first slave control interface is disposed on the switch chip; and the switch chip is adapted to configure a transmission path of the first-mode signal and the second-mode signal based on a control signal received by the first slave control interface.

7. The communication circuit according to claim 1, wherein the shared radio frequency circuit comprises a power amplifier chip; the first control interface comprises a second slave control interface;

the second slave control interface is disposed on the power amplifier chip; and the power amplifier chip is configured to amplify the first-mode signal and the second-mode signal based on a control signal received by the second slave control interface.

8. The communication circuit according to claim 7, wherein a frequency range of the first-mode signal is different from and overlaps a frequency range of the second-mode signal.

9. The communication circuit according to claim 1, wherein a frequency range of the first-mode signal is different from and overlaps a frequency range of the second-mode signal.

10. The communication circuit according to claim 1, wherein:

the first control interface comprises a first slave control interface, a second slave control interface, third slave control interface, and a fourth slave control interface; and the level-2 slave control interface comprises one or more of the first slave control interface, the second slave control interface, the third slave control interface, or the fourth slave control interface.

11. The communication circuit according to claim 1, wherein the first-mode signal is a 5G signal; and the second-mode signal is a 4G signal.

12. The communication circuit according to claim 1, wherein the first-mode signal is a cellular network signal; and the second-mode signal is a wireless local area network signal.

13. The communication circuit according to claim 12, wherein the first-mode signal is a 4G signal or a 5G signal; and the second-mode signal is a Wi-Fi 6 signal or a Wi-Fi 5 signal.

14. The communication circuit according to claim 13, wherein the baseband processing circuit comprises a first baseband processing chip and a second baseband processing chip;

the first control interface comprises a level-1 slave control interface and a level-2 master control interface;

the level-2 master control interface comprises a first master control interface and a second master control interface;

the first master control interface is located on the first baseband processing chip; the second master control interface is located on the second baseband processing chip; and the first master control interface and the second master control interface are coupled to the slave control interface by using the control bus.

15. A communication circuit, comprising:

an antenna configured to receive and send a first-mode signal and a second-mode signal;

a baseband processing circuit; and a shared radio frequency circuit coupled between the baseband processing circuit and the antenna, wherein the shared radio frequency circuit is configured to process the first-mode signal and the second-mode signal in a time-division manner, wherein:

the shared radio frequency circuit comprises a first control interface, the baseband processing circuit comprises a second control interface coupled to the first control interface via a control bus, the shared radio frequency circuit comprises an envelope tracking chip, the first control interface comprises a third slave control interface, the third slave control interface is disposed on the envelope tracking chip, and the envelope tracking chip is configured to supply, based on a control signal received by the third slave control interface, power to a power amplifier used for the first-mode signal and the second-mode signal.

16. The communication circuit according to claim 15, wherein the envelope tracking chip is configured to operate in an envelope tracking mode and in an average power tracking mode;

a bandwidth of the first-mode signal is greater than a bandwidth of the second-mode signal, the envelope tracking chip is configured to supply power to the power amplifier in the average power tracking mode for the first-mode signal; and the envelope tracking chip is configured to supply power to the power amplifier in the envelope tracking mode for the second-mode signal.

17. The communication circuit according to claim 16, wherein the shared radio frequency circuit comprises a low noise amplifier chip;

the first control interface comprises a fourth slave control interface; the fourth slave control interface is disposed on the low noise amplifier chip; and the low noise amplifier chip is configured to amplify the first-mode signal and the second-mode signal based on a control signal received by the fourth slave control interface.

18. A terminal, comprising:

a memory;

a processor;

an input/output apparatus; and a communication circuit comprising:

an antenna configured to receive and send a first-mode signal and a second-mode signal, a baseband processing circuit, and a shared radio frequency circuit coupled between the baseband processing circuit and the antenna, wherein the shared radio frequency circuit is configured to process the first-mode signal and the second-mode signal in a time-division manner, wherein:

the shared radio frequency circuit comprises a first control interface, the baseband processing circuit comprises a second control interface coupled to the first control interface via a control bus, and the second control interface is adapted to configure the shared radio frequency circuit to process the first-mode signal and the second-mode signal in the time-division manner, the shared radio frequency circuit comprises a radio frequency transceiver chip, the first control interface comprises a level-1 slave control interface and a level-2 master control interface, the level-1 slave control interface and the level-2 master control interface are jointly disposed on the radio frequency transceiver chip, the radio frequency transceiver chip is adapted to receive a configuration of the baseband processing circuit through the level-1 slave control interface, and the radio frequency transceiver chip is adapted to configure a level-2 slave control interface through the level-2 master control interface.

19. A method, comprising:

receiving or transmitting a first-mode signal and a second-mode signal by an antenna;

processing, by a shared radio frequency circuit coupled to the antenna, the first-mode signal and the second-mode signal in a time-division manner; and configuring, by a baseband processing circuit, the shared radio frequency circuit to process the first-mode signal and the second-mode signal in the time-division manner, wherein:

a first control interface of the shared radio frequency circuit is coupled to a second control interface of the baseband processing circuit via a control bus, the second control interface is adapted to configure the shared radio frequency circuit to process the first-mode signal and the second-mode signal in the time-division manner, the shared radio frequency circuit comprises a radio frequency transceiver chip, the first control interface comprises a level-1 slave control interface and a level-2 master control interface, the level-1 slave control interface and the level-2 master control interface are jointly disposed on the radio frequency transceiver chip, the radio frequency transceiver chip receives configuration of the baseband processing circuit through the level-1 slave control interface, and the radio frequency transceiver chip configures a level-2 slave control interface through the level-2 master control interface.

20. The method of claim 19, further comprising, switching, by the shared radio frequency circuit, from processing the first-mode signal to processing the second-mode signal while operating in a running mode.

* * * * *